United States Patent

Burrous et al.

[15] 3,705,316

[45] Dec. 5, 1972

[54] TEMPERATURE COMPENSATED LIGHT SOURCE USING A LIGHT EMITTING DIODE

[72] Inventors: Clifford N. Burrous, Santa Clara; Gordon J. Deboo, Sunnyvale, both of Calif.

[73] Assignee: The United States of America as represented by the Administrator of the National Aeronautics and Space Administration

[22] Filed: Dec. 27, 1971

[21] Appl. No.: 212,028

[52] U.S. Cl.................307/311, 250/205, 250/211 J, 250/217 SS, 307/310

[51] Int. Cl.........................H03k 19/14, H05b 33/08

[58] Field of Search..............250/205, 211 J, 217 SS; 307/310, 311; 328/2, 3

[56] References Cited

UNITED STATES PATENTS

| | | | |
|---|---|---|---|
| 3,359,483 | 12/1967 | Biard | 307/311 X |
| 3,421,375 | 1/1969 | Dimon | 307/310 X |
| 3,486,028 | 12/1969 | Schade | 250/217 SS |
| 3,525,942 | 8/1970 | Boronkay et al. | 307/311 X |
| 3,626,214 | 12/1971 | Wesner | 307/290 |

*Primary Examiner*—Herman Karl Saalbach
*Assistant Examiner*—R. C. Woodbridge
*Attorney*—Darrell G. Brekke et al.

[57] ABSTRACT

A temperature compensated light source including a thermistor, several resistors, an operational amplifier and a light emitting diode combined in such a manner that the non-linear characteristics of the thermistor cause the operational amplifier to vary the energizing current supplied to the light emitting diode to compensate for the non-linear temperature characteristics of the diode. The radiant energy output of the light source is constant if a fixed input voltage is applied to its input terminal, or will vary in direct proportion to a variable input voltage applied to its input terminal.

12 Claims, 6 Drawing Figures

INVENTORS
CLIFFORD N. BURROUS
GORDON J. DEBOO
BY
ATTORNEY

INVENTORS
CLIFFORD N. BURROUS
GORDON J. DEBOO
BY
ATTORNEY

TEMPERATURE COMPENSATED LIGHT SOURCE USING A LIGHT EMITTING DIODE

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates generally to semiconductor junction light sources and more particularly to a temperature compensated light source including a light emitting diode (LED) and temperature compensation circuitry for maintaining the luminous power output of the diode constant independent of temperature variations.

2. Description of the Prior Art

Applications of PN junction light emitting diodes range from electro-illuminescent displays to such electronic functions as card reading, character recognition, sensing, electro-optical switching, optical ranging, illumination, meterology, communication, intrusion alarms and warning devices, just to name a few. In many of these applications, it is necessary that the luminous power output of the LED be held constant as a large variation with temperature cannot be tolerated in certain applications. Since the radiant energy output of most light emitting diodes changes considerably with temperature, some form of temperature compensation must be provided.

Presently, one of two methods is used to eliminate thermal variation in the radiant output of light emitting diodes. The first involves the use of frequency modulation or pulse coding techniques to convert DC or slowly varying analog signals to AC. In such methods the analog date is made to modulate a carrier, or is converted to some pulse code. The carrier voltage is then applied to the LED thereby causing it to radiate light in sympathy with the applied voltage. The AC nature of the transmission eliminates DC drift effects. After transmission, the detected light signal is then converted back into an electrical signal which is fed to a suitable demodulator, the output of which is a reproduction of the original analog input. The disadvantages associated with this method include increased cost, noise, power consumption and weight, plus reduced reliability and bandwidth introduced by the required modulation and demodulation. Furthermore, the upper frequency limit of the data to be transmitted is limited because the analog data must have a much lower bandwidth than the carrier frequency.

The second method utilizes the temperature coefficient of a bipolar transistor and/or a thermistor connected in series with the LED to compensate for the reduction of LED radiant output with increasing temperature. Although this type of temperature compensation is quite simple, it generally does not provide accuracy, linearity, or repeatability better than about ±5 percent over a limited (20°C) temperature range. The limiting factors are the basic transistor non-linearities of $h_{fe}$ vs. $I_c$, temperature, $V_{CE}$, and frequency, plus the unrepeatability of these characteristics from transistor to transistor.

SUMMARY OF THE PRESENT INVENTION

It is therefore an object of the present invention to provide an improved temperature compensated light emitting diode source of illumination.

Another object of the present invention is to provide an energizing circuit for a light emitting diode which automatically maintains the luminous power output of the diode constant irrespective of ambient temperature changes.

Still another object of the present invention is to provide a circuit for energizing a light emitting diode and maintaining the relationship between the luminous power of the diode and a variable input signal constant independent of ambient temperature changes.

Briefly, the present invention includes a thermistor, several resistors, an operational amplifier and a light emitting diode combined in such a way that the non-linear characteristics of the thermistor cause the operational amplifier to vary the energizing current supplied to the diode in such a manner as to compensate for the non-linear temperature characteristics of the diode. The preferred embodiment of the present invention uses precision components such as operational amplifiers, metal film resistors and precision thermistors with highly predictable characteristics in conjunction with negative feedback. Thus, the compensation is far more accurate than is obtainable using other compromise methods.

One of the principle advantages of the present invention is that since no carrier frequency is used, the attendant limitations in bandwidth, additional noise, extra circuit complexity due to the necessary modulation or demodulation schemes, extra cost, power, size and weight are not involved.

These and other advantages of the present invention will no doubt become apparent to those of ordinary skill in the art after having read the following detailed disclosure of a preferred embodiment which is shown in the several figures of the drawings.

IN THE DRAWINGS

DETAILED DESCRIPTION OF THE PREFERRED EMBODIMENTS

Figure 1:
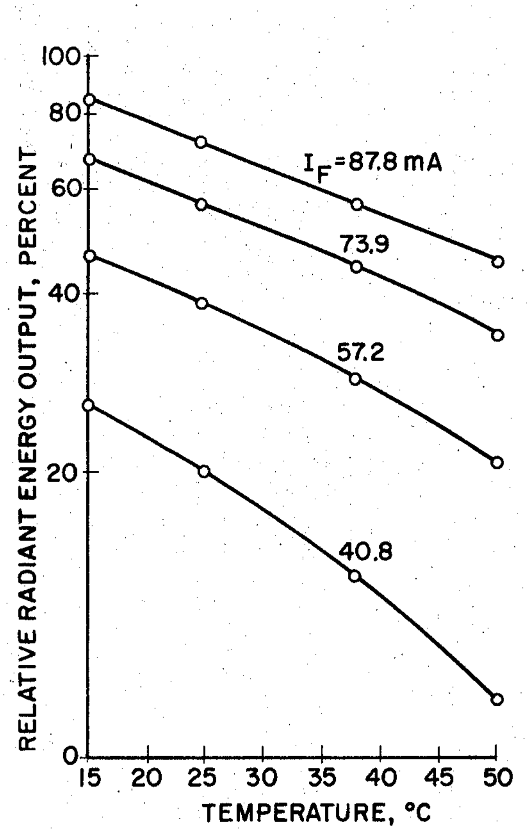
FIG. 1 is a diagram illustrating the thermal characteristics of an uncompensated light emitting diode in terms of relative radiant energy output vs. temperature.

Referring now to FIG. 1 of the drawing, a diagram is shown illustrating the extreme temperature dependence of a light emitting diode such as the GaAs LED. This data was obtained by placing an HPA 4120 LED in a temperature controlled chamber and measuring its radiant energy output while driving it from an external power supply at various constant current levels. From these curves it can be seen that an increase in temperature causes a substantial change in the radiant energy output of the LED for forward currents $I_F$ over a wide range (40.8 - 87.8 mA).

Figure 2:
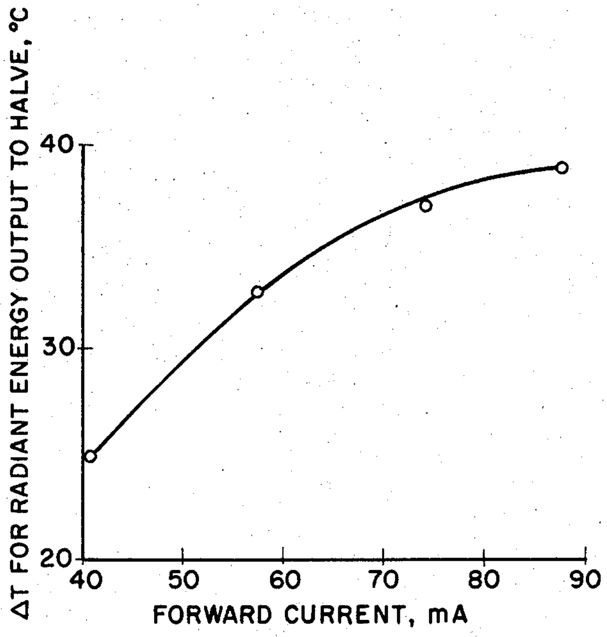
FIG. 2 is a diagram illustrating the thermal characteristics of an uncompensated light emitting diode in terms of the change in temperature required to reduce the radiant energy output to one half vs. the forward current $I_F$.

This change in the radiant energy output is perhaps more dramatically illustrated by the curve shown in FIG. 2 wherein the same data used in FIG. 1 is replotted to illustrate the fact that the thermal rate of change of radiant energy output is dependent upon the magnitude of the forward current $I_F$.

Although the curves in FIG. 1 show a fairly linear relationship between the LED's forward current $I_F$ and its radiated energy output, at least above some threshold level, it appears that one means of providing temperature compensation for an LED would be to alter its forward current $I_F$ in proportion to the ambient temperature. However, the curve of FIG. 2 quite clearly shows that the required increase in forward current is not a simple linear relationship, and therefore in order to provide temperature compensating current levels, a current control means which responds nonlinearly to temperature variations in a manner corresponding to the temperature characteristics of the LED must be provided.

Figure 3:
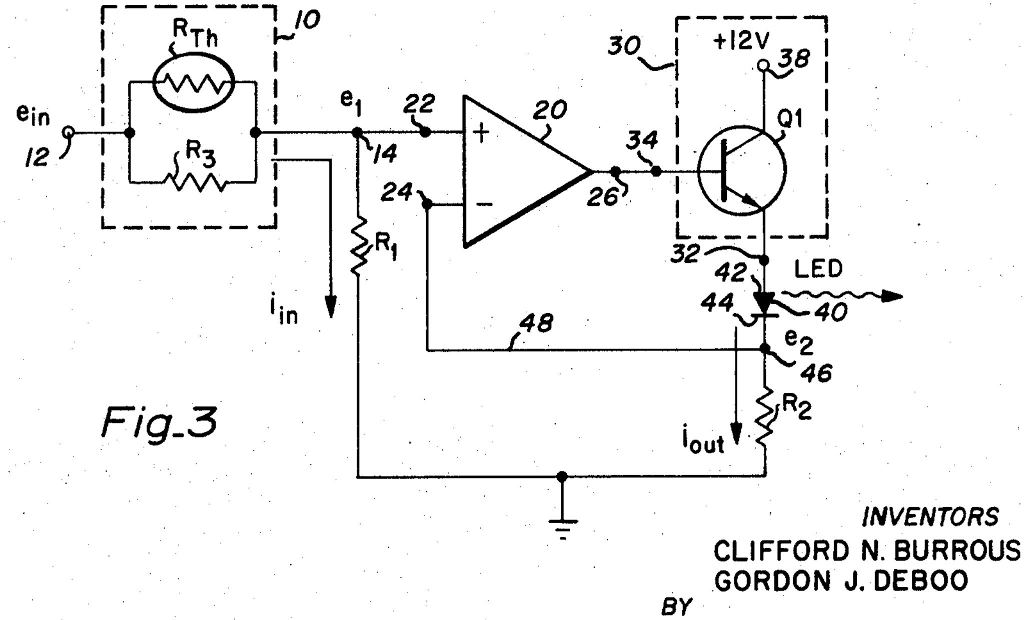
FIG. 3 is a circuit diagram schematically illustrating a temperature compensation circuit for a light emitting diode in accordance with a preferred embodiment of the present invention.

In FIG. 3 of the drawing, a simplified block diagram schematically illustrates a preferred embodiment of a temperature compensating means in accordance with the present invention. This embodiment includes a temperature responsive variable impedance means 10, an operational amplifier 20, a voltage responsive variable current supply means 30, a light emitting diode (LED) 40, a first resistor $R_1$ and a second resistor $R_2$.

Amplifier 20 is a conventional operational amplifier having a non-inverting input terminal 22 which is coupled to a circuit node 14, an inverting input terminal 24, and an output terminal 26. In the preferred embodiment, amplifier 20 is a very high gain device such as the LM 101 requiring very little voltage difference across its input terminals to produce a corresponding voltage difference at its output terminal 26. It also has high input impedance and low bias current requirements so that negligible current flows into either of its input terminals.

Current supply means 30 may take the form of any suitable current source capable of supplying a current at its output terminal 32 which is directly proportional to the potential developed at its input terminal 34. In the preferred embodiment, current source 30 includes a type 2N1613 NPN transistor Q1, having its base coupled to terminal 34, its collector coupled to a +12 voltage potential supply at terminal 38, and its emitter coupled to the output terminal 32. Where the amplifier 20 is itself capable of developing output currents sufficient to drive LED 40, current supply means 30 may be eliminated from the circuit.

LED 40 is a conventional light emitting diode, such as the type HPA 4120, which generates luminous power in response to a forward current flow $i_{out}$ caused to flow therethrough. The current $i_{out}$ is the same as $I_F$ in the diagrams of FIGS. 1 and 2. The anode 42 of LED 44 is coupled to current source terminal 32 and its cathode 44 is coupled to a second circuit node 46. Circuit node 46 is coupled to the negative input terminal of amplifier 20 by line 48 and is coupled to circuit ground by a $R_2$. For simplicity, in the preferred embodiment resistor $R_2$ is a 1.0 ohm precision resistor. The first circuit node is also coupled to a circuit ground by a resistor $R_1$ having a value which is determined as explained below.

Impedance means 10 may include any suitable resistance element or combination of resistance elements which vary non-linearly with temperature in complimentary fashion to the temperature response characteristics of LED 40. In the preferred embodiment, impedance means 10 includes a thermistor $R_{Th}$ and a resistor $R_3$ which are coupled in parallel between the input terminal 12 and the circuit node 14. Thermistor $R_{Th}$ is a resistive element whose resistance varies with temperature. Its temperature coefficient can be either positive or negative, but in the present embodiment, the resistance decreases with temperature so that the coefficient is negative.

Since amplifier 20 has a high input impedance and low bias current requirements, negligible current flows into either of its input terminals and thus the currents $i_{in}$ and $i_{out}$ can be considered to flow as indicated by the arrows. Since the feedback developed by amplifier 20 through line 48 will be such as to maintain the potential $e_1$ at its input terminal 22 equal to the potential $e_2$ at its input terminal 24, it will be seen that like voltages will be impressed across $R_1$ and $R_2$, i.e., $e_1 = e_2$. Hence, the current $i_{in} = e_1/R_1$ and the current $i_{out} = e_1/R_2$. The current gain of the system is thus $R_1/R_2$.

The thermistor/resistor network including thermistor $R_{Th}$ and the resistors $R_1$ and $R_3$ can be designed so that $i_{in}$, and thus $i_{out}$, varies in accordance with the current demands required by LED 40 to maintain constant radiant energy output. Once a particular thermistor $R_{Th}$ has been selected, the resistance values of resistors $R_1$ and $R_3$ are determined by mathematical circuit analysis after having found the forward current $I_F$ required to produce constant radiant energy output at three temperature extremes.

The three temperatures selected should include the nominal operating temperature (possibly room temperature) of LED 40 plus the two anticipated temperature extremes. Also, the value of constant radiant energy output should be chosen near the mid $I_F$ range and care should be taken not to exceed the maximum allowable $I_F$. In addition, the three measured values of forward currents, $I_F$, should all be normalized to the room temperature current. Since $$i_{out} = (R_1/R_2)\, i_{in} \qquad (1)$$

and $R_2$ has a resistance of 1.0 ohm, $i_{out}$ may be expressed as $$i_{out} = R_1 i_{in}. \qquad (2)$$

Similarly, $i_{in}$ may be expressed as $$i_{in} = e_{in}/\left[\, [R_{Th}R_3/(R_{Th}+R_3)] + R_1 \right] \qquad (3)$$

and thus $i_{out}$ may be expressed as $$i_{out}=R_1 e_{in}/[[R_{th}R_3/(R_{Th}+R_3)]+R_1]. \quad (4)$$

Using the three sets of data obtained for LED 40 and the thermistor $R_{Th}$, values for $R_1$, $R_3$, and $e_{in}$ can be obtained by the solution of three simultaneous $i_{out}$ equations. In the illustrated preferred embodiment, the following values were selected:

$R_1 = 3.24$ KΩ, $R_3 = 10$Ω, and $e_{in} = 0.1454$ volts.

In operation, with an ambient temperature of 20°C, it can be seen from the curves of FIG. 1 that in order to obtain a 50 percent relative radiant energy output, $i_{out}$ must be approximately 64 mA. Thus for a fixed $e_{in}$ of 0.1454 volts, the impedances of $R_{Th}$, $R_1$ and $R_3$ must combine in such a manner that a current $i_{in}$ of approximately 19.7 mA flows through resistor $R_1$. Amplifier 20 will then develop an output potential at terminal 26 sufficient to cause $e_1$ to equal $e_2$, and as per equation (1) this current is 64 mA which is precisely that required by LED 40.

If then the ambient temperature rises to 40°C, the resistance of the selected thermistor $R_{Th}$ will decrease to a value of 4.86 KΩ causing $i_{in}$ to rise to approximately 26 mA which, as per equation (2) is the current required to cause amplifier to drive current source 30 to produce a current $i_{out}$ of 84.3. From the curves shown in FIG. 1 it can be seen that this is precisely the forward current required to cause LED 40 to maintain its relative radiant energy output of 50 percent.

Figure 4:
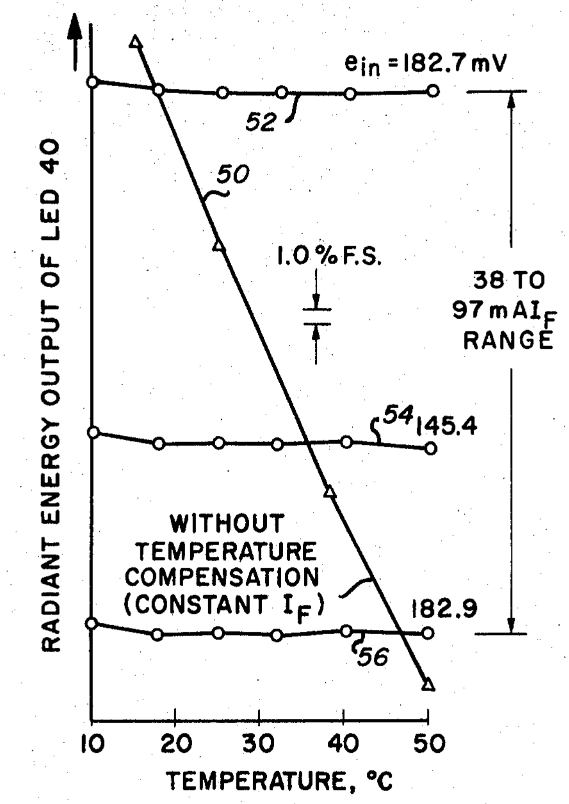
FIG. 4 is a diagram illustrating the operation of the circuit shown in FIG. 3 in terms of radiant energy output vs. temperature.

FIG. 4 of the drawing illustrates the results of the temperature compensation obtained in the circuit of FIG. 3. The sloped line 50 shows the LED thermal drift without temperature compensation at constant $I_F$ while the curves 52, 54 and 56 show the luminous output of LED 40 for three values of $e_{in}$. Note that the range of input voltages shown causes the LED forward current $I_F$ to vary from approximately 38 to 97 mA. The upper limit was determined by the manufacturers maximum allowable $I_F$, and the lower limit was chosen to avoid the non-linear portion of the $I_F$ vs. Radiant Output characteristic.

Figure 5:
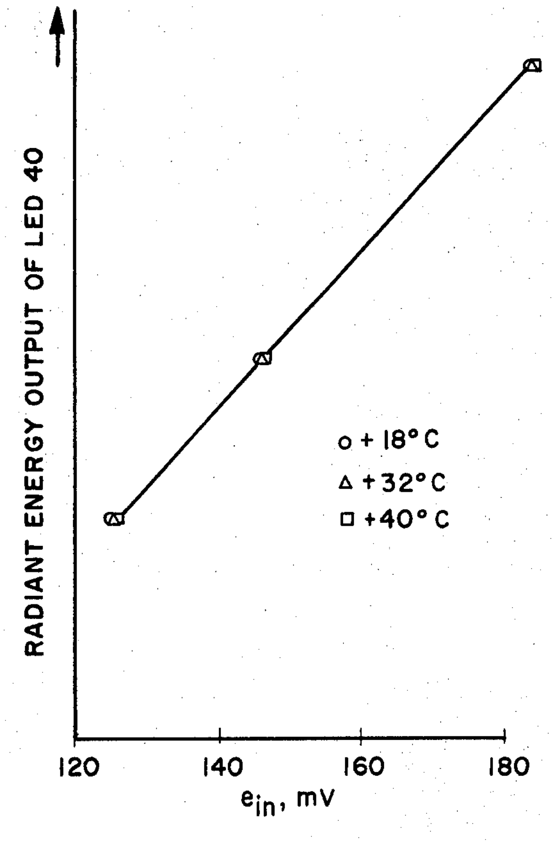
FIG. 5 is a diagram illustrating the linearity of the circuit shown in FIG. 3 in terms of radiant energy output versus input voltage $e_{in}$.

In the diagram of FIG. 5, the data illustrated in FIG. 4 is rearranged to illustrate the overall system linearity. Note from this diagram that the luminous output power of LED 40 is directly proportional to the input signal $e_{in}$ applied to input terminal 12. The linearity characteristics illustrated in FIG. 5 and the range of temperature compensation shown in FIG. 4 illustrate that the circuit is just as applicable for variable analog input signals as for a constant DC input signal. That is, if $e_{in}$ is a varying analog voltage $e_1$, $e_2$, $i_{in}$, $i_{out}$ and the radiant energy output will vary linearly with $e_{in}$ over a wide range of output powers. Furthermore, the thermistor/resistor network compensates for changes of radiated output power $P_o$ so that as the temperature varies, $\Delta P_O/\Delta e_{in}$ remains constant.

In the simplified embodiment, illustrated in FIG. 3, the input signal $e_{in}$ must always remain positive with respect to circuit ground and must be restricted to a range commensurate with the maximum and minimum $I_F$ levels for LED 40. However, for applications where the input signal is negative, and/or extends outside of the above mentioned range, an inverting preamplifier with offset control and signal limiting features may be added to the embodiment of FIG. 3.

Figure 6:
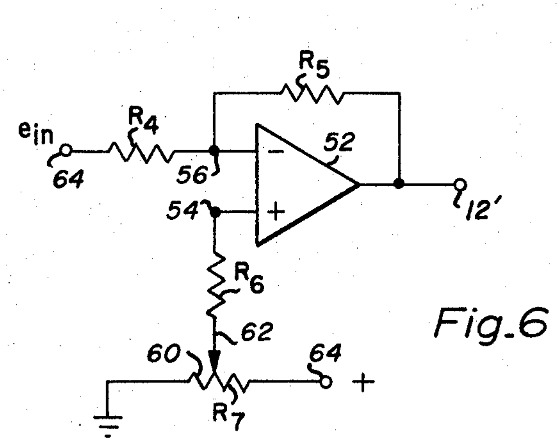
FIG. 6 is a circuit diagram schematically illustrating an inverting preamplifier for use in accordance with an alternate embodiment of the present invention.

A simplified embodiment of an inverting preamplifier is shown in FIG. 6 and includes an operational amplifier 52 having a non-inverting input terminal 54, an inverting input terminal 56, and an output terminal 12', three resistors $R_4$, $R_5$ and $R_6$ and a potentiometer 60 including a resistive body $R_7$ and a wiper 62. Although not shown, the preamplifier may also include certain additional circuitry for providing the signal limiting features referred to above.

Resistor $R_4$ couples the new circuit input terminal 64 to the inverting input terminal 56 to amplifier 52 while resistor $R_5$ provides negative feedback by coupling the amplifiers output terminal 12' to its inverting input terminal 56. Resistor $R_6$ couples the positive input terminal 54 of amplifier 50 to the wiper 62 of potentiometer 60. The resistance $R_7$ is connected between a positive voltage supply and circuit ground so that potentiometer 60 can be used to provide offset control for the preamplifier.

In operation, the preamplifier converts any bipolar input signal $e_{in}$ applied to its input terminal 64 into a "-positive only" output signal at its output terminal 12'. Thus, by coupling terminal 12' to the input terminal 12 of the temperature compensation circuit of FIG. 3, a circuit is provided whereby the radiant energy output of LED 40 may be controlled in response to a wide range of both positive and negative input signals. In other words the preamplifier will provide a positive input to the circuit of FIG. 3 regardless of the polarity of the input signal, and the limiting and offset capabilities of the preamplifier will accommodate the maximum and minimum $I_F$ requirements.

Although the illustrated preferred embodiment is shown having a 2:1 $T_F$ range, this limitation could be reduced by two methods. First, LED 40 could be operated well below the limit of $P_O$ vs. $I_F$ linearity because the technique of measuring the desired $I_F$ compensates for such non-linearities. Secondly, an autoranging system could be incorporated into the preamplifier to extend the range.

Although the present invention has been described in terms of a specific preferred embodiment, it will be appreciated that after having read the above description many alterations and modifications of the invention will no doubt become apparent to those of ordinary skill in the art. Accordingly, it is intended that this disclosure be considered as exemplary rather than limiting, and that the appended claims be interpreted as covering all such alterations and modifications as fall within the true spirit and scope of the invention.

What is claimed is:

1. A temperature compensated light source, comprising:

a light emitting diode for developing radiant energy in response to a first current applied thereto, said diode having a non-linear radiant energy output vs. temperature characteristic;

means for developing a second current which changes with ambient temperature in a manner commensurate with said nonlinear characteristic; and means responsive to said second current and operative to supply a temperature compensated first current to said light emitting diode whereby the radiant energy output of said light emitting diode is maintained constant independent of ambient temperature.

2. A temperature compensated light source as recited in claim 1 wherein said means for developing a second current includes a first source of potential, a second source of potential, and a series circuit coupling said first source of potential to said second source of potential, said series circuit being comprised of a resistance means having a resistance which varies with temperature, and a first resistor.

3. A temperature compensated light source as recited in claim 1 wherein said means responsive to said second current includes a current regulating means for causing said first current to have a predetermined relationship to said second current.

4. A temperature compensated light source as recited in claim 3 wherein said means responsive to said second current further includes an operational amplifier for comparing said first and second currents and developing a control signal commensurate with the difference therebetween for driving said current regulating means.

5. A temperature compensated light source, comprising:

a light emitting diode for developing a radiant energy output in response to a first current caused to flow therethrough, said radiant energy output being constant when said first current varies with the ambient temperature in a predetermined non-linear fashion;

means for developing a second current which varies with the ambient temperature in a manner proportional to said predetermined non-linear fashion; and means responsive to said second current and operative to supply a first current to said light emitting diode such that the ratio between said first and second currents is fixed.

6. A temperature compensation circuit for a light emitting diode, comprising:

a first source of potential, a second source of potential, and a third source of potential;

a first series circuit coupling said first source of potential to said second source of potential and including, a resistance means having a resistance which varies nonlinearly with temperature, and a first resistor;

a second series circuit coupling said third source of potential to said second source of potential and including, a current regulating means, the light emitting diode, and a second resistor, said current regulating means being responsive to any difference in the potential drops across said first and second resistors and operative to cause the current flowing through said second series circuit to bear a predetermined relationship to the current flowing through said first series circuit whereby the radiant energy output of said light emitting diode is proportional to the magnitude of the potential of said first source.

7. A temperature compensation circuit for a light emitting diode, comprising:

a first series circuit including a temperature responsive resistance means and a first resistor, said resistance means having a resistance which varies non-linearly with temperature;

a second series circuit including, a current regulating means, the light emitting diode, and a second resistor;

first means for causing a first current to flow through said first series circuit; and second means for causing a second current to flow through said second series circuit, said current regulating means being responsive to the different in the IR drops across said first and second resistors and operative to cause said first and second currents to have a predetermined ration whereby the radiant energy output of said light emitting diode remains constant independent of temperature.

8. A temperature compensation circuit as recited in claim 7 wherein said current regulating means includes an operational amplifier for comparing the IR drop across said first resistor to the IR drop across said second resistor.

9. A temperature compensation circuit as recited in claim 7 wherein said resistance means is comprised of a third resistor and a thermistor connected in parallel.

10. A temperature compensation circuit as recited in claim 7 wherein said current regulating means includes, an operational amplifier having a first input terminal coupled to the circuit junction of said resistance means to said first resistor, a second input terminal coupled to the circuit junction of said diode to said second resistor, an output terminal, and a transistor having a base electrode coupled to said output terminal, a collector electrode coupled to said second means, and an emitter coupled to said light emitting diode.

11. A temperature compensation circuit as recited in claim 10 wherein said second current ($i_{out}$) is defined by the expression $i_{out} = R_1 e_{in}/R_2\ [\ [R_{Th}R_3/(R_{Th}+R_3)] + R_1]$ where $R_1$ is the resistance of said first resistor, $e_{in}$ is the potential applied across said first series circuit, $R_2$ is the resistance of said second resistor, $R_{Th}$ is the resistance of said thermistor, and $R_3$ is the resistance of said third resistor.

12. A circuit for maintaining the radiant energy output of a light emitting diode constant over a selected operating temperature range, comprising:

a first source of potential and a second source of potential;

a resistance means having a resistance which varies non-linearly with temperature;

a first resistor connected in series with said resistance means to form a first series circuit between said first and second sources of potential;

a second resistor connected in series with said light emitting diode to form a second series circuit; and an operational amplifier responsive to any difference in the potential drops across said first and second resistors and operative to develop an electrical current in said second series circuit which is commensurate with said difference, said electrical current maintaining the radiant energy output of said light emitting diode constant independent of ambient temperature.

* * * * *